United States Patent
Foskey et al.

(10) Patent No.: US 9,476,312 B2
(45) Date of Patent: Oct. 25, 2016

(54) SWASHPLATELESS ACTIVE BLADE PITCH CONTROL WITH A MECHANICAL DELTA-3 RESTRAINT HAVING AN INSTANTANEOUS BLADE PITCH-FLAP COUPLING RESPONSE

(71) Applicant: Bell Helicopter Textron Inc., Fort Worth, TX (US)

(72) Inventors: Christopher E. Foskey, Keller, TX (US); Frank B. Stamps, Colleyville, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 851 days.

(21) Appl. No.: 13/841,390

(22) Filed: Mar. 15, 2013

(65) Prior Publication Data
US 2014/0271203 A1 Sep. 18, 2014

(51) Int. Cl.
*B63H 1/06* (2006.01)
*F01D 7/00* (2006.01)
(Continued)

(52) U.S. Cl.
CPC .............. *F01D 7/00* (2013.01); *B64C 27/605* (2013.01); *B64C 27/72* (2013.01); *B64C 2027/7216* (2013.01); *Y02T 50/34* (2013.01); *Y10T 29/49316* (2015.01)

(58) Field of Classification Search
CPC .................. F01D 7/00; B64C 27/605; B64C 2027/7216; Y10T 29/49316
USPC ....................................... 416/417
See application file for complete search history.

(56) References Cited

U.S. PATENT DOCUMENTS

| 2008/0112808 A1 | 5/2008 | Schmaling et al. |
| 2008/0279685 A1* | 11/2008 | Kessler ................ B64C 27/001 416/31 |
| 2009/0269199 A1 | 10/2009 | Rudley et al. |

(Continued)

FOREIGN PATENT DOCUMENTS

| DE | EP 1655221 B1 * | 7/2008 | ............. B64C 27/59 |
| EP | 1985536 | 10/2008 | |

(Continued)

OTHER PUBLICATIONS

European Search Report issued in European Application No. 13170898.4 on Apr. 8, 2014; 4 pages.

(Continued)

*Primary Examiner* — Jason Shanske
(74) *Attorney, Agent, or Firm* — Daniel J. Chalker; Edwin S. Flores; Chalker Flores, LLP

(57) ABSTRACT

An apparatus comprising a hub configured to couple to a mast, a grip configured to couple to the hub and a rotor blade, a pitch actuator coupled to the grip and configured to change a pitch of the rotor blade relative to the mast, and a delta-3 restraint coupled to the pitch actuator, wherein the delta-3 restraint is fixed relative to the mast. An apparatus comprising a hub configured to couple to a mast, a grip configured to couple to the hub and a rotor blade, a pitch actuator coupled to the grip and configured to change a pitch of the rotor blade relative to the mast, and a delta-3 restraint coupled to the pitch actuator, wherein the delta-3 restraint is configured to control the pitch of the blade relative to the mast when the pitch actuator fails, and wherein the delta-3 restraint provides an instantaneous blade pitch-flap coupling response.

20 Claims, 12 Drawing Sheets

(51) Int. Cl.
*B64C 27/605* (2006.01)
*B64C 27/72* (2006.01)

(56) References Cited

U.S. PATENT DOCUMENTS

2010/0150719 A1\* 6/2010 Waide ..................... B64C 27/68
416/147
2012/0068005 A1\* 3/2012 Kessler ................ B64C 27/001
244/17.13

FOREIGN PATENT DOCUMENTS

FR 2968653 6/2012
WO 2012/161680 11/2012

OTHER PUBLICATIONS

Communication pursuant to Article 94(3) EPC issued in European Application No. 13170898.4 on Dec. 16, 2014, 4 pages.
Communication pursuant to Article 94(3) EPC issued in European Application No. EP13170898.4 on Apr. 25, 2014, 6 pages.

\* cited by examiner

SWASHPLATELESS ACTIVE BLADE PITCH CONTROL WITH A MECHANICAL DELTA-3 RESTRAINT HAVING AN INSTANTANEOUS BLADE PITCH-FLAP COUPLING RESPONSE

CROSS-REFERENCE TO RELATED APPLICATIONS

Not applicable

STATEMENT REGARDING FEDERALLY SPONSORED RESEARCH OR DEVELOPMENT

Not applicable.

REFERENCE TO A MICROFICHE APPENDIX

Not applicable.

BACKGROUND

Generally, rotary-wing aircraft maneuver in part by changing the rotor blade angle of attack or pitch (e.g. the angle that each blade makes with the relative wind). Traditionally, changes in blade pitch have been accomplished via a swashplate connected to a pitch link/pitch horn assembly on each rotor blade. The orientation of the pitch link and pitch horn also allowed the blade pitch to change in response to blade lift and hence flapping differences that occur due to the dissymmetry of speed (e.g. between the advancing blade and the retreating blade) produced during forward flight. Rotary-wing aircraft designers refer to the angle between the location of the pitch link and a line perpendicular to the blade axis at the point the blade attaches to the hub as the delta-3 angle. The delta-3 angle is an important safety consideration in rotor hub design because it helps control the problems associated with the dissymmetry of lift that occurs in forward flight.

Active blade control is a concept that has received much attention lately. Active blade control allows the pitch of each individual rotor blade to be changed independent of the other rotor blades. Doing so allows the rotor blade pitch to be altered in ways that are not possible with swashplates, for example blade pulsing. However, helicopter manufacturers are reluctant to use active blade control because it eliminates the safety that is inherent in the mechanical pitch horn/pitch link system (e.g. the delta-3 angle). Therefore, a need exists for a swashplateless rotor hub assembly that controls pitch angle of the individual rotor blades while retaining the delta-3 angle.

SUMMARY

In one aspect, the disclosure includes an apparatus comprising a hub configured to couple to a mast, a grip configured to couple to the hub and a rotor blade, a pitch actuator coupled to the grip and configured to change a pitch of the rotor blade relative to the mast, and a delta-3 restraint coupled to the pitch actuator, wherein the delta-3 restraint is fixed relative to the mast.

In another aspect, the disclosure includes an apparatus comprising a hub configured to couple to a mast, a grip configured to couple to the hub and a rotor blade, a pitch actuator coupled to the grip and configured to change a pitch of the rotor blade relative to the mast, and a delta-3 restraint coupled to the pitch actuator, wherein the delta-3 restraint is configured to control the pitch of the blade relative to the mast when the pitch actuator fails, and wherein the delta-3 restraint provides an instantaneous blade pitch-flap coupling response.

In another aspect, the disclosure includes a method comprising providing a hub assembly comprising a hub configured to couple to a mast, a grip configured to couple to the hub and a rotor blade, a pitch actuator coupled to the grip and configured to change a pitch of the rotor blade relative to the mast, and a delta-3 restraint coupled to the pitch actuator, wherein the delta-3 restraint is configured to control the pitch of the blade relative to the mast when the pitch actuator fails, and wherein the delta-3 restraint provides an instantaneous blade pitch-flap coupling response.

BRIEF DESCRIPTION OF THE DRAWINGS

For a detailed description of the disclosed embodiments, reference will now be made to the accompanying drawings in which.

DETAILED DESCRIPTION

It should be understood at the outset that although an illustrative implementation of one or more embodiments is provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Described herein is a swashplateless rotor hub assembly comprising a pitch actuator that actively controls rotor blade pitch and a delta-3 restraint that controls the delta-3 angle when the pitch actuator fails or otherwise malfunctions. More particularly, the disclosed delta-3 restraint is anchored to the mast and provides a default delta-3 angle in the event the pitch actuator fails. The disclosed delta-3 restraint can be applied to various types of rotor hubs, including articulated and gimbaled rotor hubs.

Figure 1:
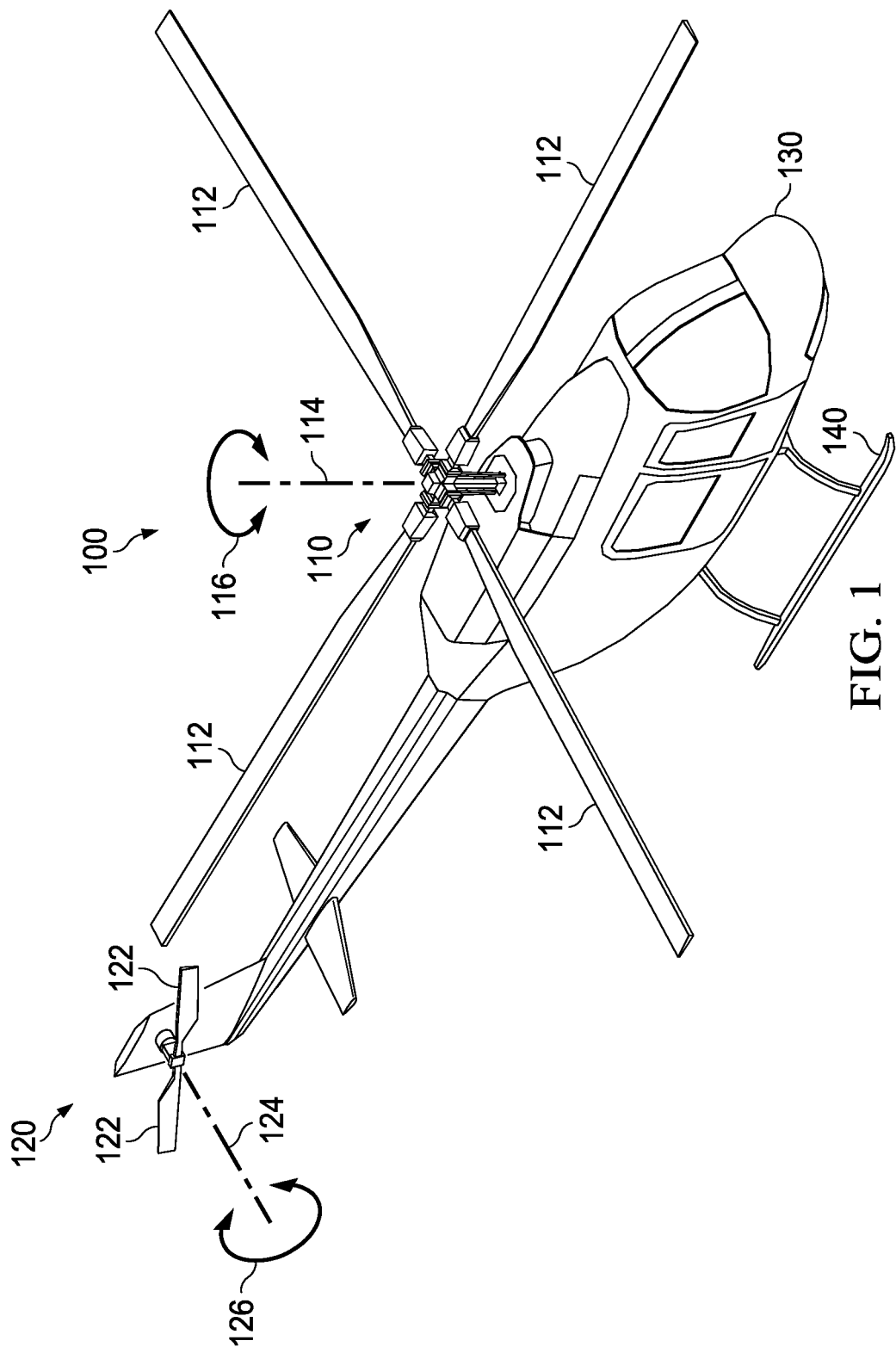
FIG. 1 is a perspective view of a helicopter according to an embodiment of the disclosure.

FIG. 1 is a perspective view of a helicopter 100. Certain embodiments of the disclosure may be used with a helicopter, such as helicopter 100. However, it should be understood that the helicopter example is given merely for illustration purposes only. Embodiments of the present disclosure are not limited to any particular setting or application, and embodiments can be used with any setting or application, including other aircraft (tilt-rotors, airplanes, etc.).

Helicopter 100 includes a main rotor assembly 110, a tail rotor assembly 120, a fuselage 130, and landing gear 140. Main rotor assembly 110 includes two or more blades 112 that are rotated about an axis of rotation 114 in either a clockwise direction or a counterclockwise direction as indicated by arrow 116. Main rotor assembly 110 generates a lift force that supports the weight of helicopter 100 and a thrust force that counteracts aerodynamic drag.

Tail rotor assembly 120 includes two or more blades 122 that are rotated about an axis of rotation 124 in either a clockwise direction or a counterclockwise direction as indicated by arrow 126. Tail rotor assembly 120 counters the torque effect created by main rotor assembly 110 and allows a pilot to control the direction helicopter 100 is pointed.

Fuselage 130 is the main body section of helicopter 100. Fuselage 130 optionally holds the crew, passengers, and/or cargo and houses the engine, transmission, gearboxes, drive shafts, control systems, etc. that are needed to establish an operable helicopter. Landing gear 140 is attached to fuselage 130, supports helicopter 100 on the ground, and allows it to take off and land.

Figure 2:
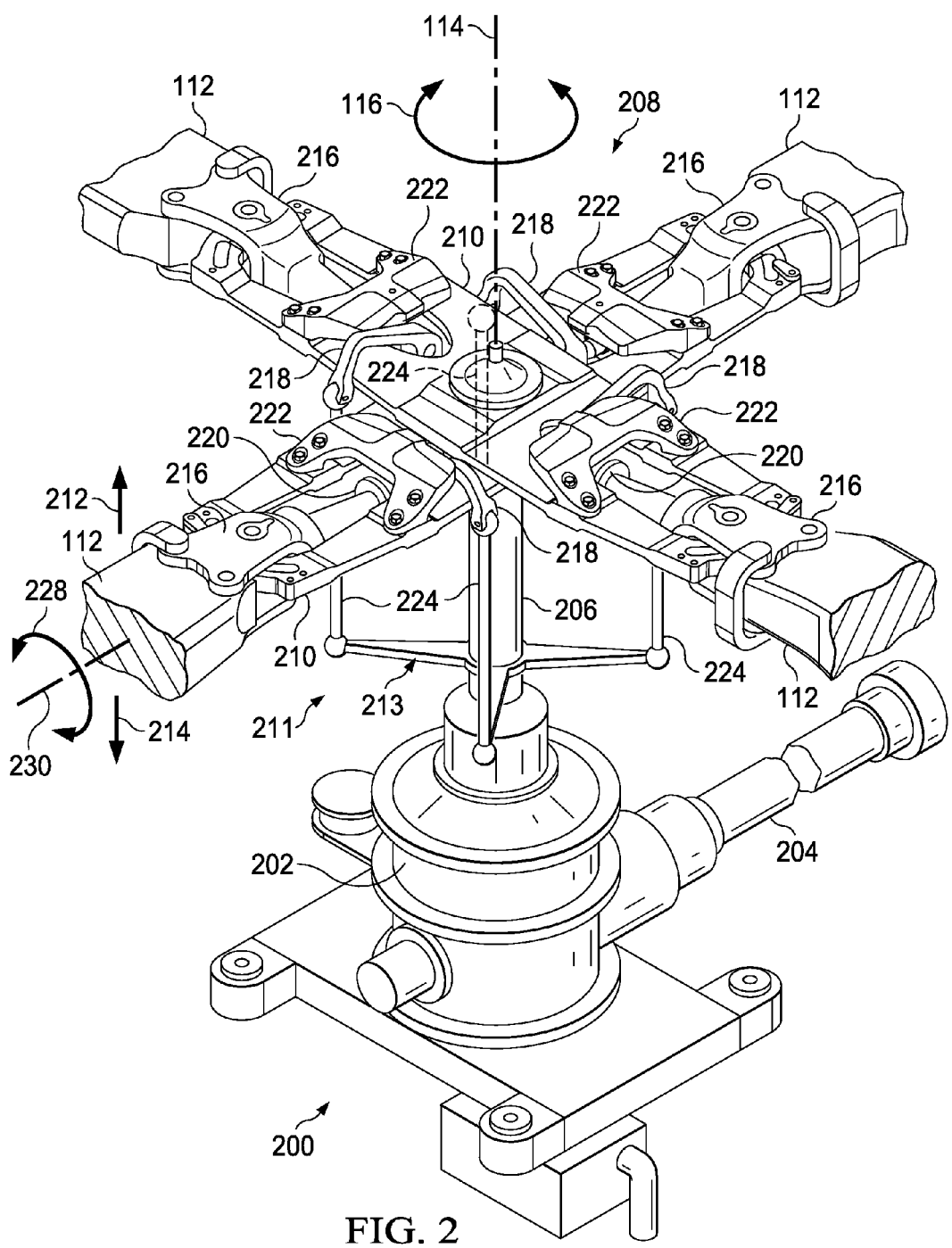
FIG. 2 is a perspective view of a power train assembly according to an embodiment of the disclosure.

FIG. 2 is a perspective view of a power train 200 according to an embodiment of the disclosure. Power train 200 can be used in a helicopter such as helicopter 100 shown in FIG. 1. Power train 200 is not however limited to any particular setting. Additionally, it should be noted that the particular example shown in FIG. 2 shows a soft in plane rotor system having four blades 112. Embodiments of the disclosure are not limited to any particular configuration of rotor system and blades, and embodiments may include any type of rotor system (e.g., fully articulated, rigid, semi-rigid, gimbaled, etc.) and may include any number of blades (e.g., 2, 3, 4, 5, 6, etc.).

Power train 200 includes a transmission 202 that receives power from an engine (not shown) through a driveshaft 204. Transmission 202 drives accessories and controls the rotation 116 of mast 206 about an axis of rotation 114. Mast 206 transfers its rotational movement to blades 112 through a hub 208 that connects mast 206 to blades 112.

Hub 208 optionally includes one or more flexible yokes 210 that enable blades 112 to flap up in the direction indicated by arrow 212 and flap down in the direction indicated by arrow 214. Hub 208 may also include a rotor grip 216 for each blade 112 that is attached to hub 208. As is described in detail below, rotor grip 216 includes an outboard end that attaches to a blade 112, an inboard end that attaches to delta-3 restraint 211, and a spindle between the outboard end and the inboard end. The delta-3 restraint 211 generally comprises a pitch horn 218 and a pitch link 224 and a mast adapter 213. The pitch horn 218 may be fixed relative to the mast 206, e.g. via pitch links 224. The spindle is supported by a shear bearing 220 that holds the spindle in place and allows it to rotate. Shear bearing 220 is in turn held in place by a bridge plate 222 that attaches shear bearing 220 to yoke 210.

As mentioned above, the delta-3 restraint 211 comprises the pitch horn 218 and the pitch link 224. The pitch links 224 may be connected to the pitch horn 218 and to the mast 206 via a universal joint (U-joint), a ball-and-socket joint, or any other type of connection allowing rotation without translation. Such may be needed to accommodate changes in geometry between the mast 206 and the pitch horn 218 when the blades 112 flap. Each pitch link 224 is substantially fixed in space relative to the mast 206. Specifically, pitch links 224 do not move vertically to change the pitch of each of the blades 112. Instead, the pitch of each of the blades 112 is controlled by a pitch actuator (shown in FIG. 3). Specifically, the pitch actuator rotates each blade 112 clockwise or counterclockwise as indicated by arrow 228 about an axis of rotation 230 that runs along the length of each blade 112. Pitch actuator may be any type of actuator (e.g. electric, hydraulic, etc.) suitable for rotating the blade (e.g. changing the blade pitch), but generally does not consist exclusively of mechanical components. Pitch actuator may be configured so that if it fails, it does so in a pre-defined position such that the blades 112 will default to a predetermined pitch that is within the allowable flight envelope when the blades 112 are flapped and controlled by the delta-3 restraint 211.

The delta-3 restraint 211 described herein may comprise a processor (not shown) for calculating an appropriate rotor blade pitch and establishing a destination position corresponding to where pitch actuator must move in order to achieve the desired rotor blade pitch and/or rotor blade 112 flapping position. The pitch actuator may comprise a servomotor (not shown) and may connect to the processor wirelessly or through electrical or optical wiring. Sensors (not shown) may be included for acquiring real-time environmental and aerodynamic data-values, and the data-values may be used by the processor in calculating the rotor blade pitch and destination position. Upon calculating the destination position, the processor may activate the pitch actuator to move the blade 112 to the destination position.

The delta-3 restraint 211 provides an instantaneous blade pitch-flap coupling response. As used herein, the term "instantaneous blade pitch-flap coupling response" may refer to a change in blade pitch that occurs simultaneously with a flap of the blade. The mechanical linkage in the delta-3 restraint 211 automatically and instantaneously changes the blade pitch when the blade 211 flaps up and down. A mechanical system, such as the delta-3 restraint 211 described herein, is inherently faster responding than any response from the pitch actuator or any purely electrical delta-3 limiter because of the time delays in the purely electrical blade pitch systems. These time delays can include the time required for the electrical systems to detect the blade flapping, determine an appropriate change in the blade pitch, instruct the pitch actuator to make the determined change in blade pitch, and for the pitch actuator to make the instructed change. These processing delays in the purely electrical systems (i.e. lacking the mechanical delta-3 restraint 211 described herein) may be sufficiently long that the rotating blade experiences a load exceeding its designed load, perhaps even loads that cause the blade 112 to structurally fail.

Figure 3:
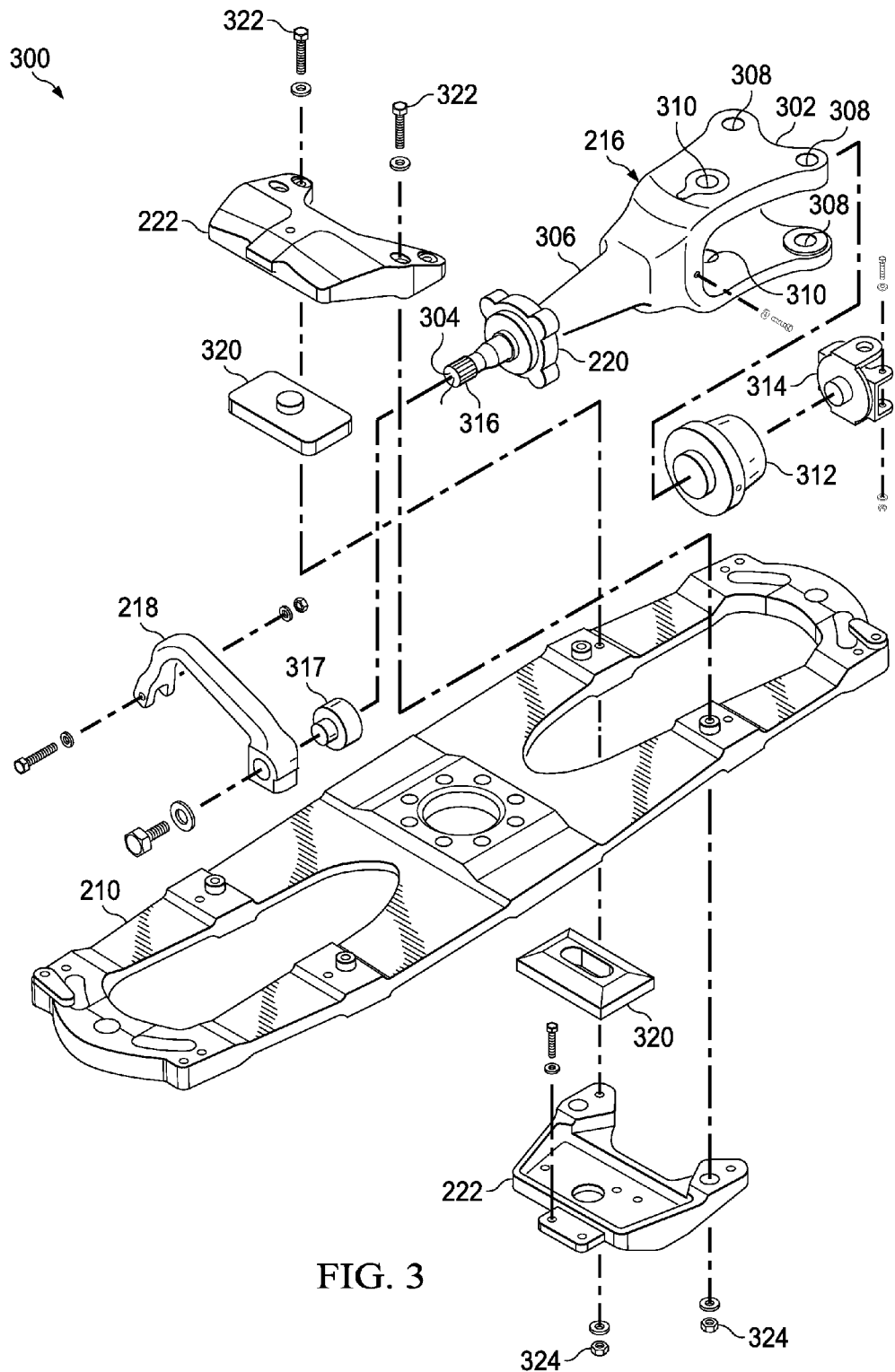
FIG. 3 is an exploded view of a yoke and rotor grip assembly according to an embodiment of the disclosure.
Figure 4:
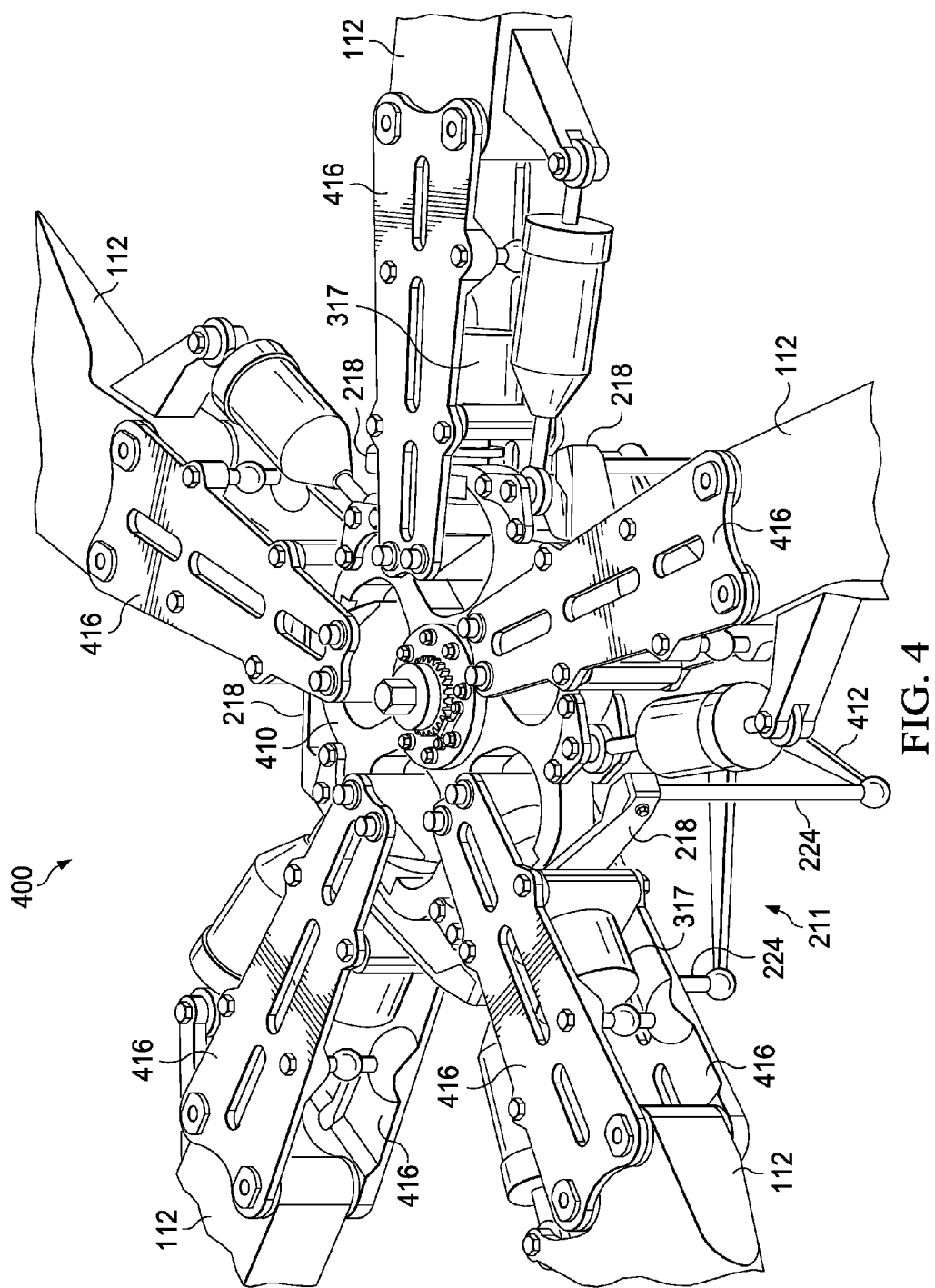
FIG. 4 is a top perspective view of an articulated rotor hub assembly including an active pitch control and a delta-3 restraint according to an embodiment.
Figure 5:
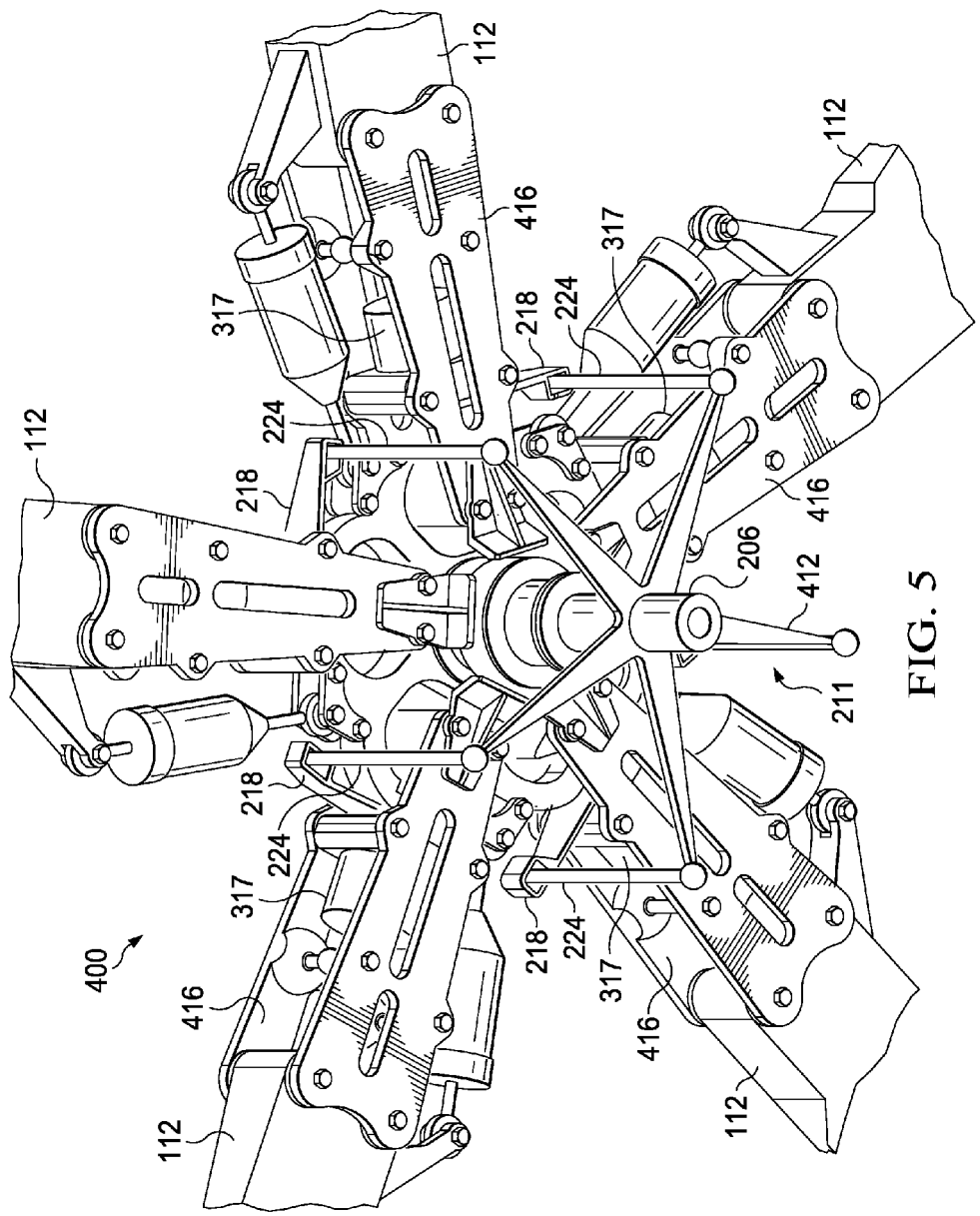
FIG. 5 is a bottom perspective view of an articulated rotor hub assembly including an active pitch control and a delta-3 restraint according to an embodiment.
Figure 6:
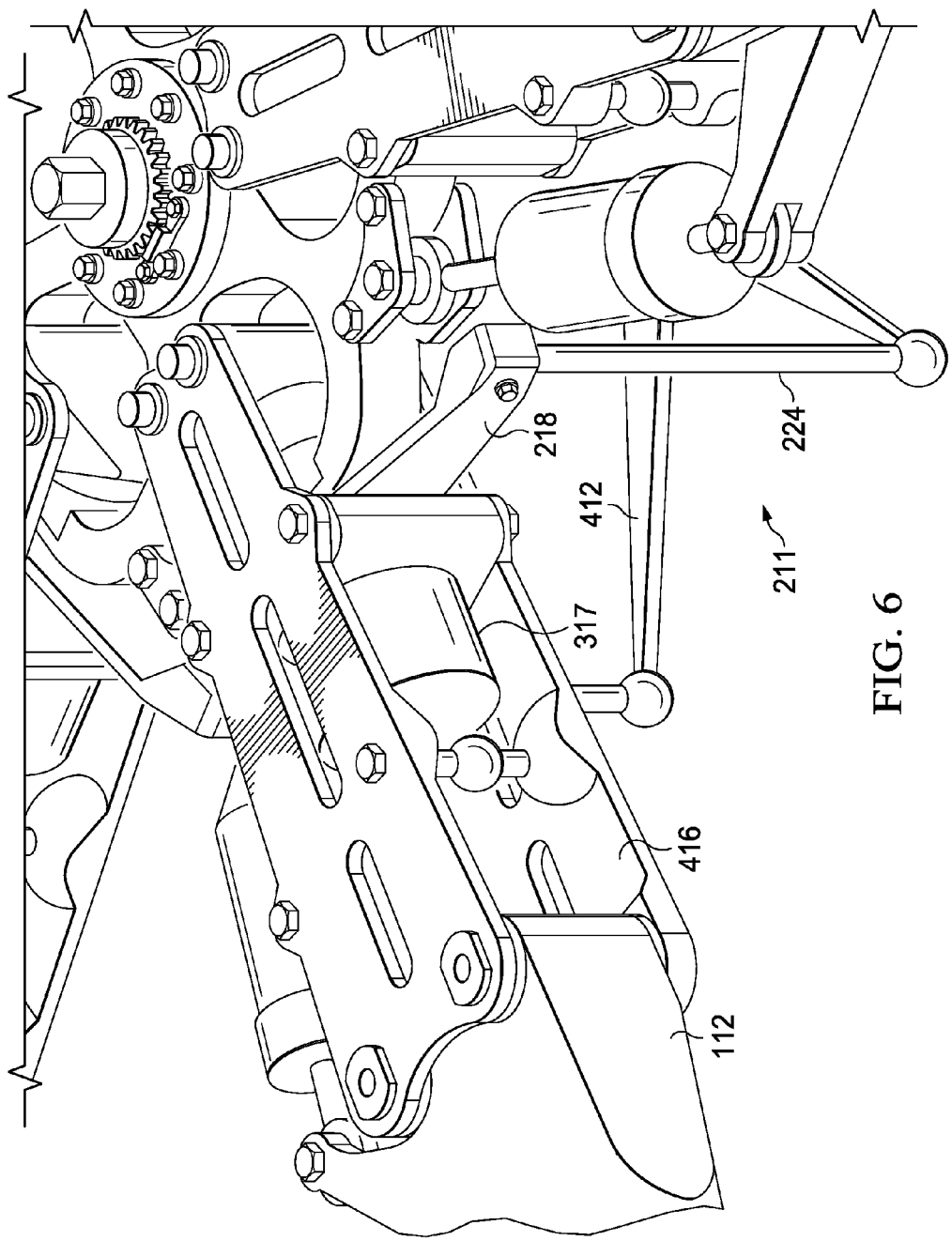
FIG. 6 is a close-up top perspective view of an articulated rotor hub assembly including an active pitch control and a delta-3 restraint according to an embodiment.
Figure 7:
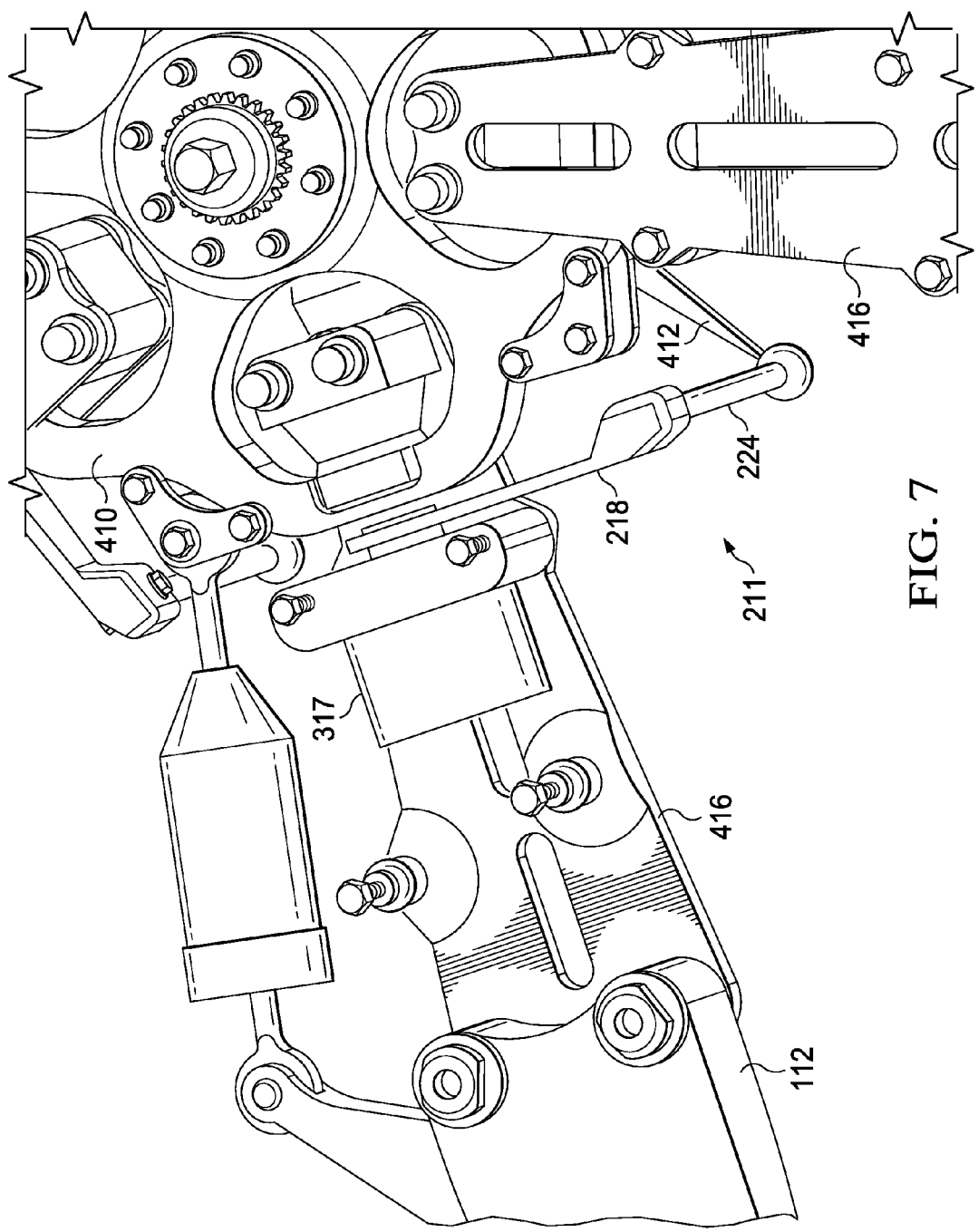
FIG. 7 is another close-up top perspective view of an articulated rotor hub assembly including an active pitch control and a delta-3 restraint according to an embodiment.
Figure 8:
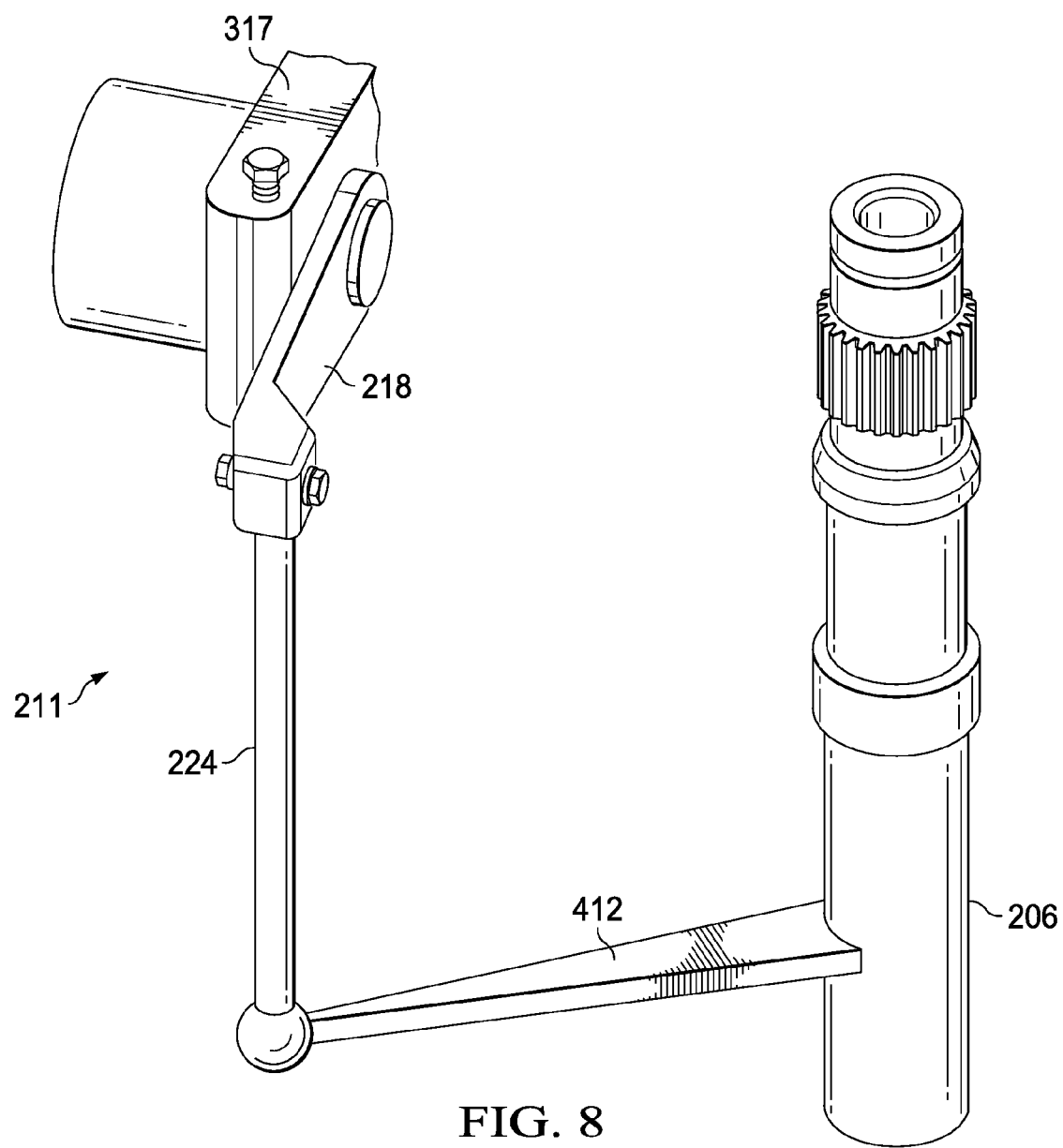
FIG. 8 is an isolated view of the embodiment of a delta-3 restraint as shown in FIGS. 4-7.

FIG. 3 is a view of a yoke and a soft in plane swashplateless rotor hub assembly 300. Rotor grip 216 includes an outboard end 302, an inboard end 304, and a spindle 306.

Outboard end 302 optionally includes one or more apertures 308 or other attachment mechanisms that are configured to attach a rotor blade (e.g., blade 112 in FIGS. 1 and 2) to rotor grip 216. Outboard end 302 may also include one or more apertures 310 or other attachment mechanisms that are configured to attach a centrifugal force (CF) bearing 312 to rotor grip 216 using a bracket 314. The rotor grip inboard end 304 optionally includes an outer surface 316 that is configured to attach to and transfer motion from pitch actuator 317 to spindle 306. Outer surface 316 may be a smooth surface or may be a textured surface (e.g., have gear teeth, splines, etc.). Pitch actuator 317 couples to the rotor grip inboard end 304 and pitch horn 218 and, when actuated, rotates the rotor grip 216. As stated previously, the pitch horn 218 and pitch link 224 (shown in FIG. 2) are relatively fixed and therefore do not move during changes in blade pitch.

Rotor grip spindle 306 is fit within shear bearing 220 that supports pitch rotation of rotor grip 216. Shear bearing 220 is optionally placed between two dampers 320 and is attached to yoke 210 using bridge plates 222. As shown in FIG. 3, bridge plates 222 may be attached to yoke 210 using an attachment mechanism such as, but not limited to, bolts 322 and nuts 324. It will be appreciated that the various components described herein may be constructed of any suitable materials, such as softer metals (e.g. steel, titanium, etc.), composites (e.g. fiberglass, carbon fiber, etc.), rubber or other elastomeric materials (e.g. for the bearings).

Turning now to FIGS. 4-8, an articulated swashplateless rotor hub assembly 400 comprising an embodiment of an active pitch control and delta-3 restraint 211 is disclosed. In the particular embodiment depicted in FIGS. 4-8, the articulated swashplateless rotor hub assembly 400 comprises five rotor blades; however, the articulated swashplateless rotor hub assembly 400 may comprise any number of rotor blades while remaining within the scope of the present disclosure. The articulated swashplateless rotor hub assembly 400 generally comprises many of the same components as the soft in plane swashplateless rotor hub assembly 300, and thus only the differences will be discussed herein.

The articulated swashplateless rotor hub assembly 400 may comprise a mast 206 coupled to a hub 410 such that the hub 410 rotates with the mast 206. The hub 410 is coupled to the blades 112 via a grip 416. The grip 416 may be C-shaped when viewed along the blade plane, and a bearing (e.g. a CF bearing, etc.) may be positioned between the hub 410 and the grip 416 to accommodate the CF loads from the blades 112. Persons of ordinary skill will appreciate that the articulated swashplateless rotor hub assembly 400 may comprise various other bearings, dampeners (e.g. lead-lag dampeners, etc.) that need not be described here.

The articulated swashplateless rotor hub assembly 400 may comprise the pitch actuator 317 and the delta-3 restraint 211, which may comprise the pitch horn 218, the pitch link 224, and the mast adapter 412. The pitch actuator 317 may be coupled to the grip 416 and the pitch horn 218 and be configured to rotate the pitch of the grip 416 relative to the mast 206. As with the other embodiments described herein, the pitch horn 218 may be coupled to the pitch link 224 via any suitable connection (e.g. U-joint, ball-and-socket joint, etc.), and the pitch link 224 may be coupled to the mast adapter 412 via a similar connection. However, the connection between the pitch horn 218 and the pitch link 224 and the connection between the pitch horn 224 and the mast adapter 412 need not be the same type of connection. The mast adapter 412 may be affixed to the mast 206 (e.g. via a splined connection) or otherwise fixed relative to the mast 206 such that the mast adapter 412 rotates with the mast 206. Finally, it will be appreciated that the pitch actuator 317 may be positioned on the inboard side of the grip (e.g. opposite of the bearing) such that the pitch actuator 317 is within one of the loops of hub 410.

Figure 9:
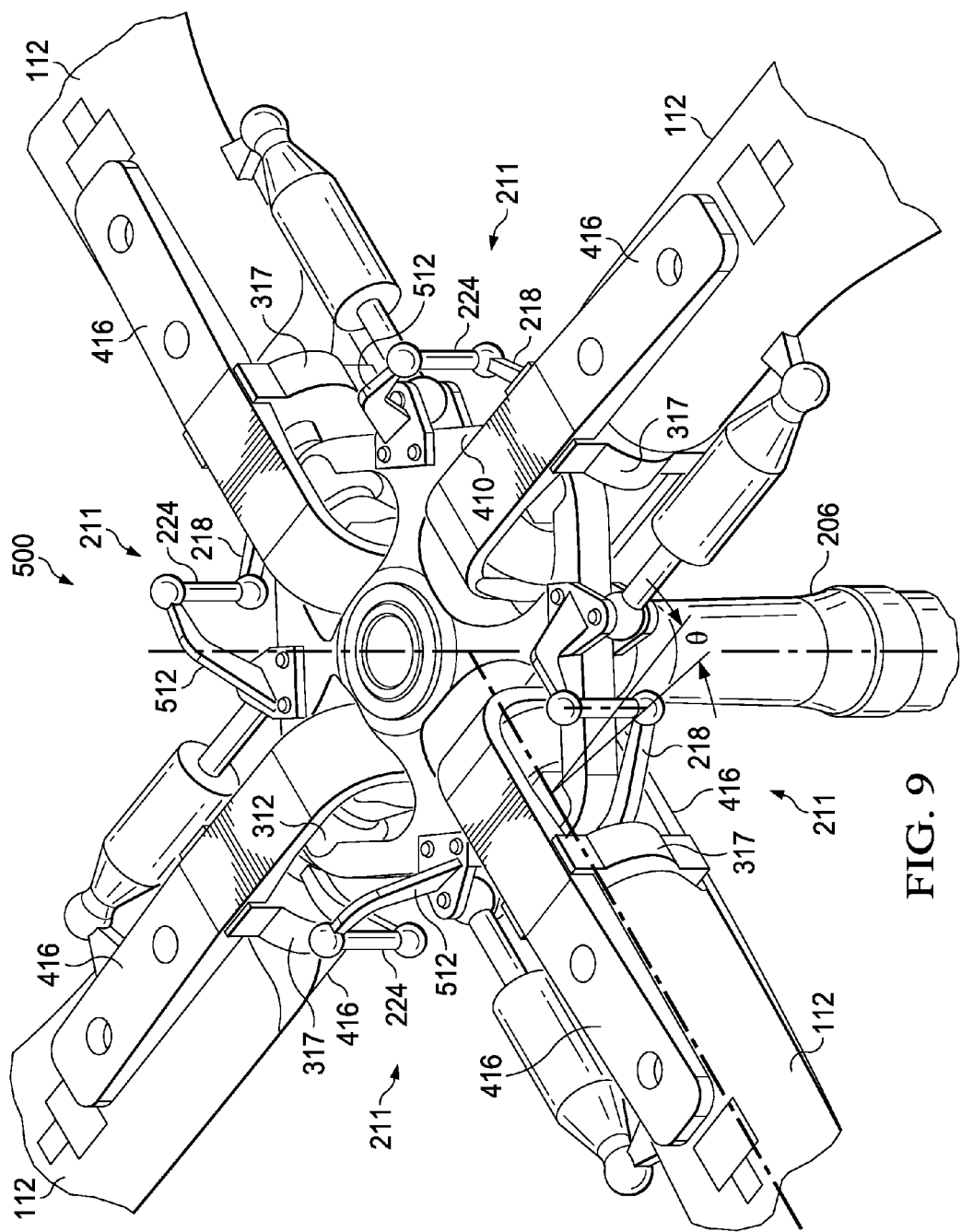
FIG. 9 is a top perspective view of an articulated rotor hub assembly including an active pitch control and a delta-3 restraint according to another embodiment.
Figure 10:
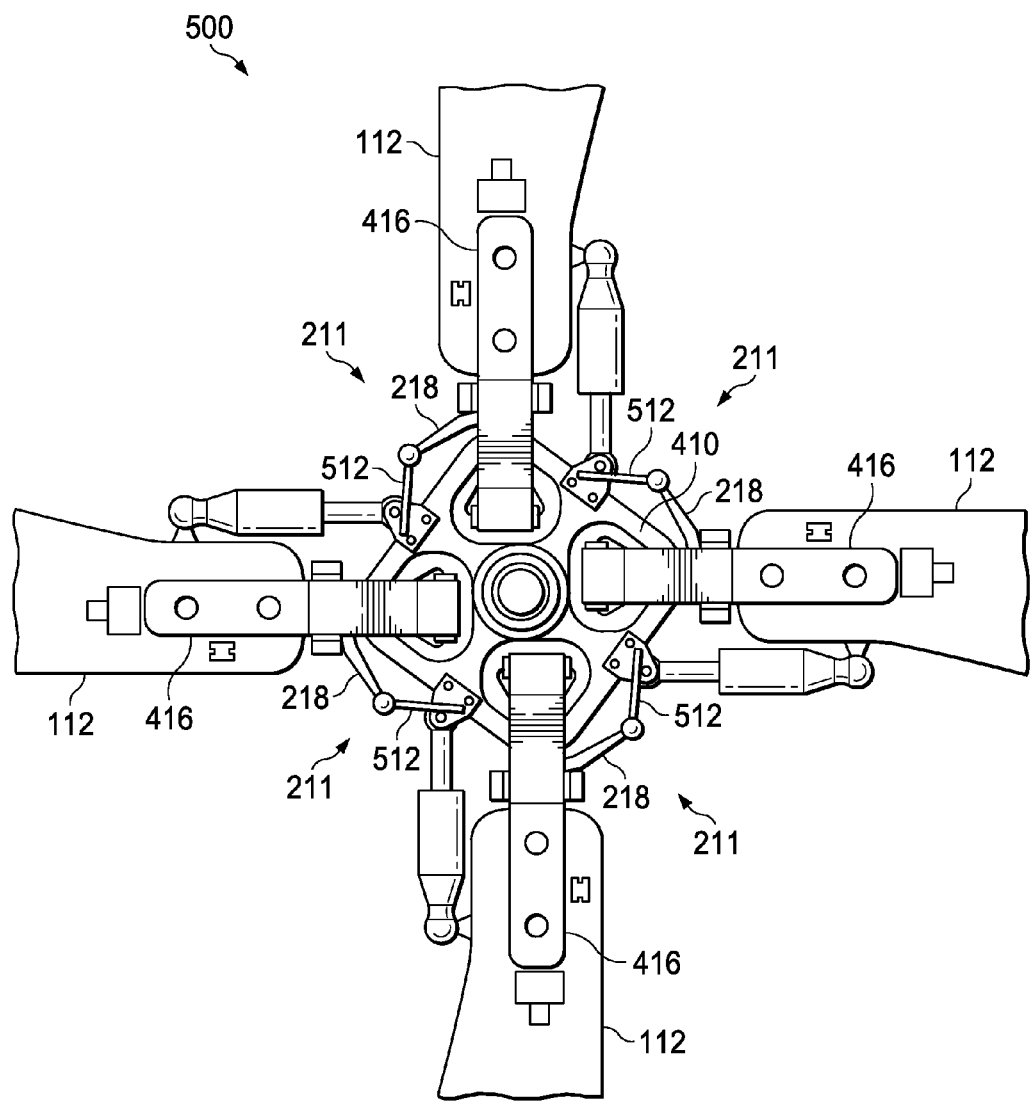
FIG. 10 is a top plan view of an articulated rotor hub assembly including an active pitch control and a delta-3 restraint according to the other embodiment.

Turning now to FIGS. 9-10, another embodiment of an articulated swashplateless rotor hub assembly 500 comprising an embodiment of an active pitch control and delta-3 restraint 211 is disclosed. In the particular embodiment depicted in FIGS. 9-10, the articulated swashplateless rotor hub assembly 500 comprises four rotor blades; however, the articulated swashplateless rotor hub assembly 500 may comprise any number of rotor blades while remaining within the scope of the present disclosure. The articulated swashplateless rotor hub assembly 500 generally comprises many of the same components described in the previous embodiments, and thus only the differences will be discussed herein.

The articulated swashplateless rotor hub assembly 500 differs from the articulated swashplateless rotor hub assembly 400 in that the articulated swashplateless rotor hub assembly 500 comprises a hub-mounted mast adapter 512 as opposed to a mast-mounted mast adapter 412 (shown in FIGS. 4-8). The delta-3 restraint 211 is configured the same as and functions as described above, with the exception that the pitch link 218 is located under the mast adapter 512 instead of above the mast adapter 412 as shown in FIGS. 4-8. The connections between the various components of the delta-3 restraint 211 (e.g. the pitch horn 218, the pitch link 224, and the mast adapter 512) may be substantially the same as described above (E.g. U-joints, ball-and-socket joints, etc.). The delta-3 angle, $\Theta$, is shown in FIGS. 9 and 10. Also, persons of ordinary skill will appreciate that the articulated swashplateless rotor hub assembly 500 may comprise various other bearings, dampeners (e.g. lead-lag dampeners, etc.) that need not be described here.

Figure 11:
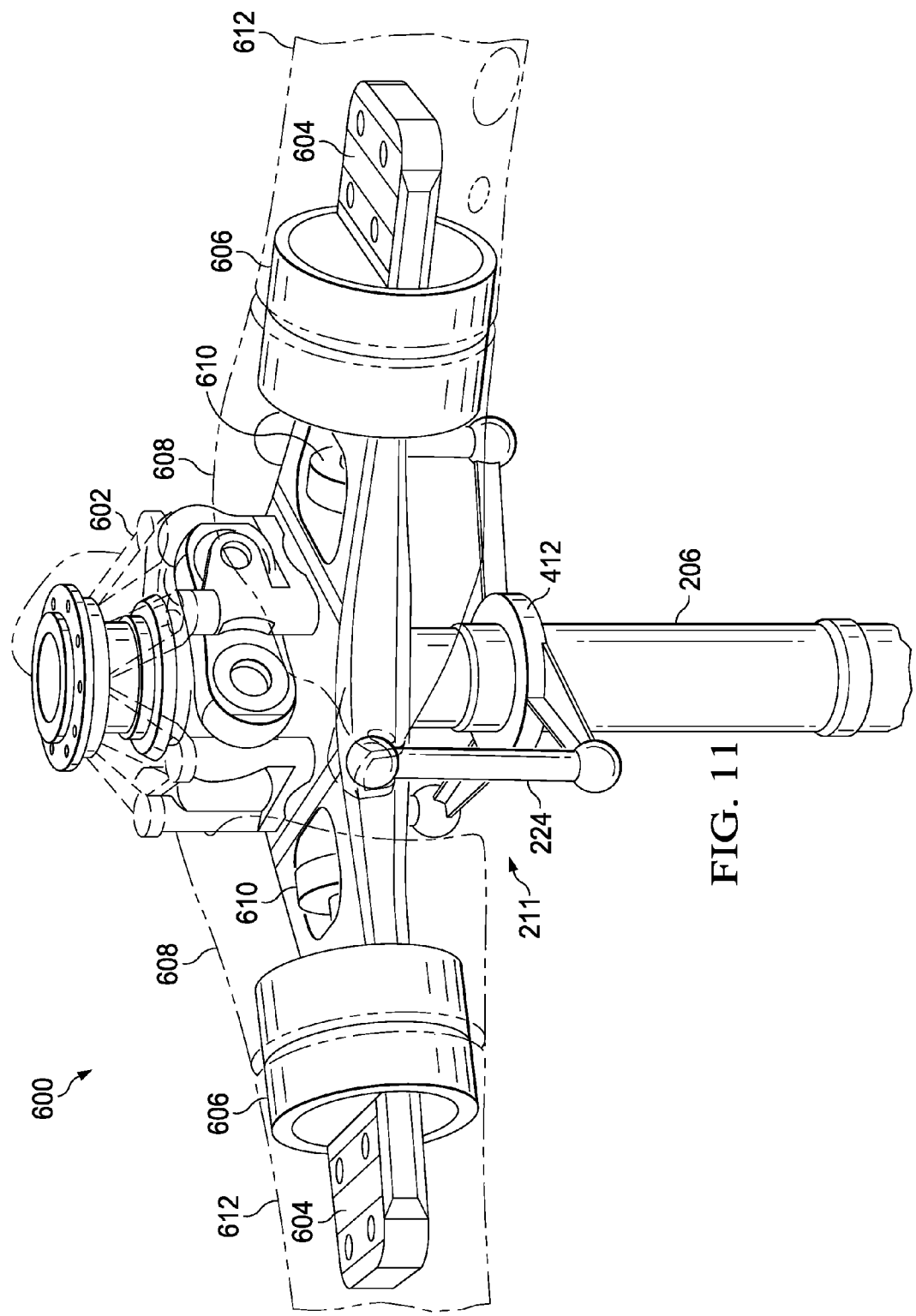
FIG. 11 is perspective view of a gimbaled rotor hub assembly including an active pitch control and a delta-3 restraint according to an embodiment.

Turning now to FIG. 11, an embodiment of a gimbaled swashplateless rotor hub assembly 600 comprising an embodiment of an active pitch control and delta-3 restraint 211 is disclosed. In the particular embodiment depicted in FIG. 11, the gimbaled swashplateless rotor hub assembly 600 comprises three rotor blades; however, the gimbaled swashplateless rotor hub assembly 600 may comprise any number of rotor blades while remaining within the scope of the present disclosure. The gimbaled swashplateless rotor hub assembly 600 generally comprises many of the same components described in the previous embodiments, and thus only the differences will be discussed herein.

Gimbaled swashplateless rotor hub assembly 600 differs from the previously described embodiments in that the rotor hub assembly tilts with the blades and relative to the mast 206. Specifically, the gimbaled swashplateless rotor hub assembly 600 comprises a gimbal assembly 602 that allows the yoke 604 to tilt relative to the mast 206. The gimbaled swashplateless rotor hub assembly 600 also comprises a blade cuff 612 that connects to the blade and which encloses the various bearings (CF bearing, pitch bearings, etc.). A pitch actuator 606 may be connected to the cuff 612 and to the delta-3 restraint 211, specifically the pitch horn 608. The pitch horn 608 may be shaped similar to the cuff 612 (e.g. to maintain an aerodynamic shape). The pitch horn 608 may be coupled to the pitch link 224, which is connected to the mast adapter 412. The connections between the pitch horn 608, the pitch link 224, and the mast adapter 412 may be substantially the same as described above. Another set of bearings 610 (e.g. another pitch bearing, inboard beam bearing, etc.) may be located between the pitch actuator 606 and the gimbal assembly 602. The operation, the delta-3 restraint 211 of the gimbaled swashplateless rotor hub assembly 600 operates substantially the same as described above.

Figure 12:
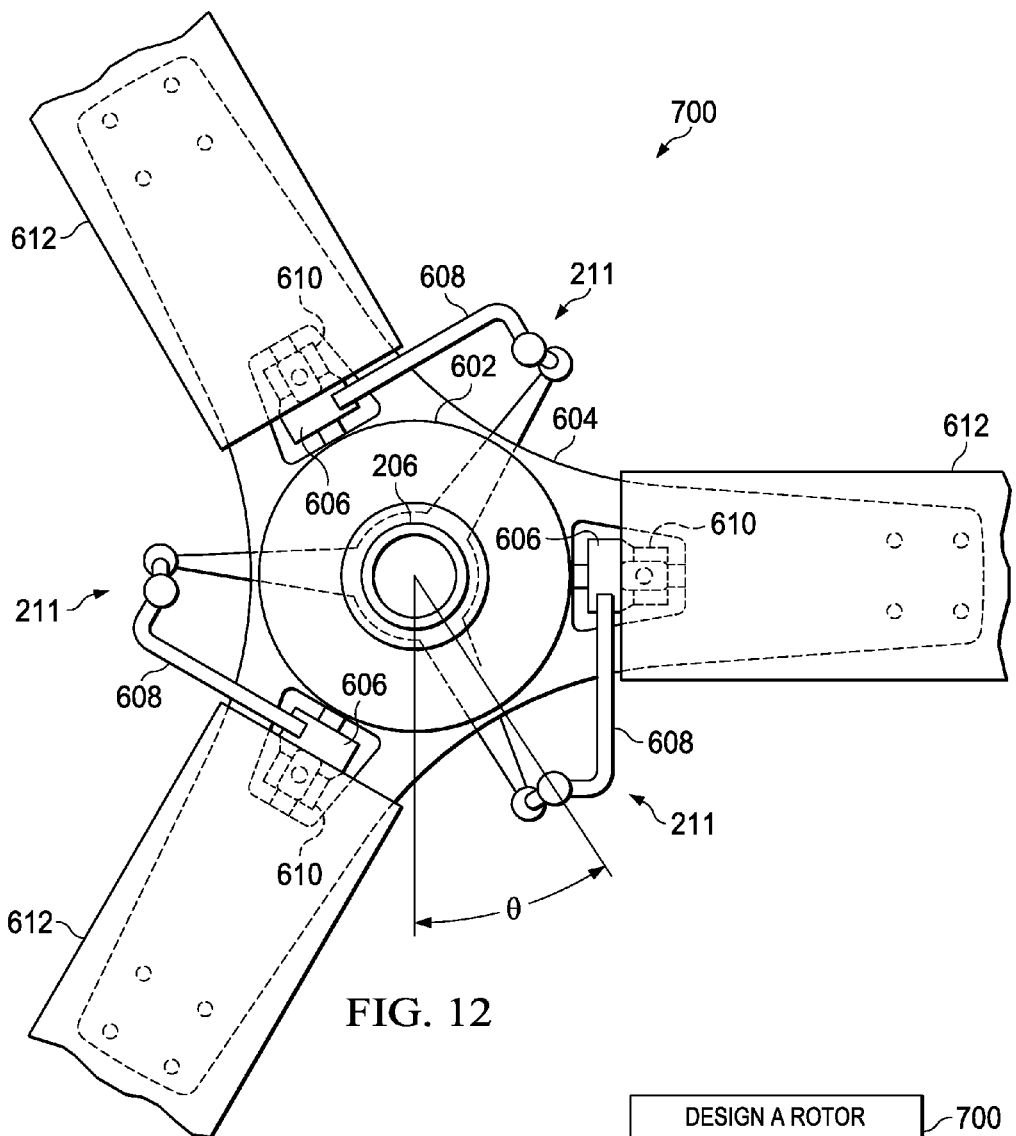
FIG. 12 is perspective view of a gimbaled rotor hub assembly including an active pitch control and a delta-3 restraint according to another embodiment.

Turning now to FIG. 12, another embodiment of a gimbaled swashplateless rotor hub assembly 700 comprising an embodiment of an active pitch control and delta-3 restraint 211 is disclosed. In the particular embodiment depicted in FIG. 12, the gimbaled swashplateless rotor hub assembly 700 comprises three rotor blades; however, the gimbaled swashplateless rotor hub assembly 700 may comprise any number of rotor blades while remaining within the scope of the present disclosure. The gimbaled swashplateless rotor hub assembly 700 generally comprises many of the same components described in the previous embodiments, and thus only the differences will be discussed herein.

Gimbaled swashplateless rotor hub assembly 700 differs from the gimbaled swashplateless rotor hub assembly 600 in that the pitch actuator 606 has been moved inboard of the inboard yoke bearings 610. Doing so substantially eliminates the axial loading due to centrifugal force applied to the pitch actuator 606. Also, the delta-3 angle, $\Theta$, is shown in FIG. 12.

Figure 13:
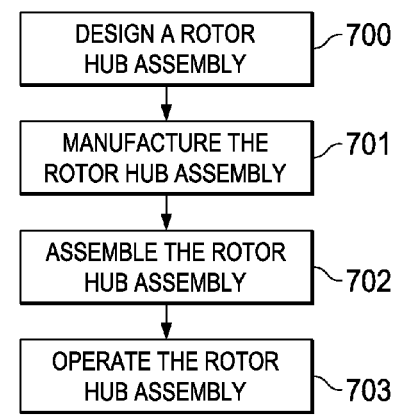
FIG. 13 is a flowchart of an embodiment of a method for creating and operating a rotor hub assembly as disclosed herein.

Turning now to FIG. 13, disclosed is a method of creating and operating a rotor hub assembly. In step 700, the method comprises designing a rotor hub assembly described herein. In step 701, the method comprises manufacturing the rotor hub assembly described herein. In step 702, the method comprises assembling the rotor hub assembly described herein. The designing, manufacturing, and assembling steps may generally be characterized as providing the rotor hub assembly described herein. In step 703, the method comprises operating the rotor hub assembly described herein. Operating the rotor hub assembly may comprise actively changing the pitch of a first rotor blade relative to a second rotor blade without the use of a swashplate while controlling the delta-3 angle as described herein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent. Of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An apparatus comprising:
   a hub configured to couple to a mast;
   a grip configured to couple to the hub and a rotor blade;
   a pitch actuator coupled to the grip and configured to change a pitch of the rotor blade relative to the mast; and
   a delta-3 restraint coupled to the pitch actuator, wherein the delta-3 restraint is fixed relative to the mast, the delta-3 restraint configured to change the blade pitch in response to flapping of the blade.

2. The apparatus of claim 1, wherein the delta-3 restraint comprises a pitch horn coupled to the pitch actuator, a pitch link coupled to the pitch horn, and a mast adapter coupled to the hub, and wherein the delta-3 restraint provides an instantaneous blade pitch-flap coupling response.

3. The apparatus of claim 2, further comprising a centrifugal force (CF) bearing that couples the grip to the hub, and wherein the pitch actuator is positioned between the CF bearing and the mast.

4. The apparatus of claim 1, wherein the delta-3 restraint comprises a pitch horn coupled to the pitch actuator, a pitch link coupled to the pitch horn, and a mast adapter coupled to the mast.

5. The apparatus of claim 4, wherein the hub comprises a yoke positioned between the mast and the grip.

6. The apparatus of claim 5, further comprising a centrifugal force (CF) bearing that couples the grip to the yoke, and wherein the pitch actuator is positioned between the grip and the mast.

7. The apparatus of claim 4, further comprising:
   a gimbal assembly that couples the mast to the yoke, the gimbal assembly configured to allow the yoke to tilt relative to the mast; and
   a cuff that couples the pitch actuator to the rotor blade.

8. The apparatus of claim 7, further comprising:
   a centrifugal force (CF) bearing; and
   a beam bearing positioned between the mast and the CF bearing,
   wherein the pitch actuator is positioned between the CF bearing and the beam bearing.

9. The apparatus of claim 7, further comprising:
   a centrifugal force (CF) bearing; and
   a beam bearing positioned between the mast and the CF bearing,
   wherein the pitch actuator is positioned between the beam bearing and the mast.

10. The apparatus of claim 1, wherein none of the grip, the mast, and the delta-3 restraint are coupled to a swashplate.

11. The apparatus of claim 1, further comprising a fuselage comprising an engine coupled to the mast via a gearbox.

12. The apparatus of claim 1, wherein the delta-3 restraint is configured to control the pitch of the rotor blade relative to the mast and provide a default delta-3 angle when the pitch actuator fails.

13. An apparatus comprising:
    a hub configured to couple to a mast;
    a grip configured to couple to the hub and a rotor blade;

a pitch actuator coupled to the grip and configured to change a pitch of the rotor blade relative to the mast; and a delta-3 restraint coupled to the pitch actuator, wherein the delta-3 restraint is configured to control the pitch of the blade relative to the mast when the pitch actuator fails, and wherein the delta-3 restraint provides an instantaneous blade pitch-flap coupling response.

14. The apparatus of claim 13, further comprising a second rotor blade, wherein the pitch actuator is configured to change the pitch of the rotor blade independently of the pitch of the second rotor blade.

15. The apparatus of claim 13, wherein the pitch of the rotor blade is changed without the use of a swashplate.

16. The apparatus of claim 13, wherein the apparatus has a delta-3 angle, and wherein the delta-3 angle is maintained using only mechanical components.

17. The apparatus of claim 16, further comprising a fuselage comprising an engine coupled to the mast via a gearbox.

18. A method comprising:

providing a hub assembly comprising:

a hub configured to couple to a mast;

a grip configured to couple to the hub and a rotor blade;

a pitch actuator coupled to the grip and configured to change a pitch of the rotor blade relative to the mast; and a delta-3 restraint coupled to the pitch actuator, wherein the delta-3 restraint is configured to control the pitch of the blade relative to the mast when the pitch actuator fails, and wherein the delta-3 restraint provides an instantaneous blade pitch-flap coupling response.

19. The method of claim 18, wherein providing the hub assembly comprises manufacturing the hub assembly.

20. The method of claim 18, wherein providing the hub assembly comprises assembling the hub assembly.

* * * * *